United States Patent [19]

Charbonneau et al.

[11] 4,351,918

[45] Sep. 28, 1982

[54] POLY(ESTER-AMIDE) CAPABLE OF FORMING AN ANISOTROPIC MELT PHASE DERIVED FROM 6-HYDROXY-2-NAPHTHOIC ACID, OTHER AROMATIC HYDROXYACID, CARBOCYCLIC DICARBOXYLIC ACID, AND AROMATIC MONOMER CAPABLE OF FORMING AN AMIDE LINKAGE

[75] Inventors: Larry F. Charbonneau, Chatham; Anthony J. East, Madison; Gordon W. Calundann, North Plainfield, all of N.J.

[73] Assignee: Celanese Corporation, New York, N.Y.

[21] Appl. No.: 251,629

[22] Filed: Apr. 6, 1981

[51] Int. Cl.$^3$ ............................................. C08G 69/44
[52] U.S. Cl. .................................. 524/602; 528/183; 528/184; 528/185; 528/210; 528/211; 528/339; 528/344
[58] Field of Search ............................. 528/183–185, 528/210, 211, 339, 344; 260/37 N; 524/602

[56] References Cited

U.S. PATENT DOCUMENTS

| | | | |
|---|---|---|---|
| 3,859,251 | 1/1975 | Kuhfuss et al. | 528/183 |
| 4,182,842 | 1/1980 | Jackson et al. | 528/184 |
| 4,272,625 | 6/1981 | McIntyre et al. | 528/183 |

Primary Examiner—Lester L. Lee
Attorney, Agent, or Firm—Charles B. Barris

[57] ABSTRACT

A melt processable poly(ester-amide) which is capable of forming an anisotropic melt phase is provided. The poly(ester-amide) of the present invention consists essentially of the recurring units (a) 6-oxy-2-naphthoyl moiety, (b) other aromatic moiety derived from aromatic hydroxyacid, (c) carbocyclic dicarboxyl moiety, (d) aromatic moiety capable of forming an amide linkage in the polymer, and, optionally, (e) dioxyaryl moiety in the proportions indicated. Preferably, the moiety capable of forming an amide linkage is derived from p-aminophenol or p-phenylenediamine. The resulting poly(ester-amide) exhibits a melting temperature below approximately 400° C., preferably below approximately 350° C. The poly(ester-amide) of the present invention is preferably formed by a melt polymerization technique.

39 Claims, No Drawings

POLY(ESTER-AMIDE) CAPABLE OF FORMING AN ANISOTROPIC MELT PHASE DERIVED FROM 6-HYDROXY-2-NAPHTHOIC ACID, OTHER AROMATIC HYDROXYACID, CARBOCYCLIC DICARBOXYLIC ACID, AND AROMATIC MONOMER CAPABLE OF FORMING AN AMIDE LINKAGE

BACKGROUND OF THE INVENTION

The use of objects molded from synthetic polymers has expanded rapidly in the last several decades. In particular, polyesters and polyamides have widely gained acceptance for general molding applications and in the formation of fibers and films. An additional class of polymers known as poly(ester-amides) has been disclosed. Such disclosures include U.S. Pat. Nos. 2,547,113; 2,946,796; 3,272,774; 3,272,776; 3,440,218; 3,475,385; 3,538,058; 3,546,178; 3,575,928; 3,676,291; 3,865,792; 3,926,923; and 4,116,943. Polyimide esters are disclosed in German Offenlegungsschrift No. 2,950,939 and in U.S. Pat. No. 4,176,223.

Although many polyesters, polyamides, and poly(ester-amides) have mechanical properties suitable for general applications, most polyesters, polyamides, and poly(ester-amides) are not suitable for high strength service because the mechanical properties are not sufficiently high. One group of polymers that are suitable for high strength service without the use of a reinforcing agent is a new class of polymers exhibiting a general overall balance of mechanical properties substantially enhanced over previous polymers. These polymers have been described by various terms, including "liquid crystalline," "liquid crystal," "thermotropic," "mesogenic," and "anisotropic." Briefly, the polymers of this new class are thought to involve a parallel ordering of the molecular chains. The state wherein the molecules are so ordered is often referred to either as the liquid crystal state or the nematic phase of the liquid crystal state. These polymers are prepared from monomers which are generally long, flat, and fairly rigid along the long axis of the molecule and commonly have chain extending linkages that are either coaxial or parallel.

Disclosures of polyesters which exhibit melt anisotropy include (a) *Polyester X7G-A Self Reinforced Thermoplastic*, by W. J. Jackson, Jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1 to 4, (b) Belgian Pat. Nos. 828,935 and 828,936, (c) Dutch Pat. No. 7505551, (d) West German Nos. 2520819, 252020, 2722120, 2834535, 2834536, and 2834537, (e) Japanese Nos. 43-223; 2132-116; 3017-692; and 3021-293, (f) U.S. Pat. Nos. 3,991,013; 3,991,014; 4,057,597; 4,066,620; 4,067,852; 4,075,262; 4,083,829; 4,093,595; 4,118,372; 4,130,545; 4,130,702; 4,146,702; 4,153,779; 4,156,070; 4,159,365; 4,161,470; 4,169,933; 4,181,792; 4,183,895; 4,184,996; 4,188,476; 4,201,856; 4,219,461; 4,224,433; 4,228,218; 4,230,817; 4,232,143; 4,232,144; 4,238,598; 4,238,599; 4,245,082; and 4,245,084; and (g) U.K. Application Nos. 2,002,404; 2,008,598A; and 2,030,158A. See also commonly assigned U.S. Ser. Nos. 54,049, now U.S. Pat. No. 4,256,624, filed July 2, 1979; 91,003, filed Nov. 5, 1979; 109,573, now U.S. Pat. No. 4,265,802, filed Jan. 4, 1980; 109,575, now U.S. Pat. No. 4,285,852 filed Jan. 4, 1980; 128,759 now U.S. Pat. No. 4,299,756, filed Mar. 10, 1980; 128,778, now U.S. Pat. No. 4,279,803, filed Mar. 10, 1980; and 169,014, filed July 15, 1980.

Representative disclosures of liquid crystalline polyamide dopes include U.S. Pat. Nos. 3,673,143; 3,748,299; 3,767,756; 3,801,528; 3,804,791; 3,817,941; 3,819,587; 3,827,998; 3,836,498; 4,016,236; 4,018,735; 4,148,774; and Re. 30,352.

U.S. Pat. No. 4,182,842 discloses poly(ester-amides) prepared from an aromatic dicarboxylic acid, ethylene glycol, and a p-acylaminobenzoic acid. Such poly(ester-amides) are also disclosed in "Liquid Crystal Polymers. III. Preparation and Properties of Poly(Ester-Amides) from p-Aminobenzoic Acid and Poly(Ethylene Terephthalate)", by W. J. Jackson, Jr. and H. F. Kuhfuss, *J. Appl. Polym. Sci.*, Vol 25, No. 8, pp 1685–94(1980). A similar disclosure is Japan No. 54-125271. These references neither disclose nor suggest the poly(ester-amide) of the present invention.

European Patent Application No. 79301276.6 (Publication No. 0 007 715) discloses melt processable fiber-forming poly(ester-amides) comprising residues of one or more amino-phenols selected from p-aminophenol and p-N-methylaminophenol and residues of one or more dicarboxylic acids. The poly(ester-amide) contains a balance of linear difunctional residues and dissymmetric difunctional residues derived from either the amino-phenols or the acids. The linear difunctional residues and dissymmetric difunctional residues are chosen so as to give a product which melts below its decomposition temperature and exhibits optical anisotropy in the melt. This patent neither discloses nor suggests the poly(ester-amide) of the present invention which contains a 6-oxy-2-naphthoyl moiety.

U.S. Pat. No. 3,859,251 discloses a poly(ester-amide) which comprises a dicarboxyl moiety which comprises 50 to 100 mole percent of units derived from an acyclic aliphatic dicarboxylic acid. Such units are not required in the poly(ester-amide) of the present invention. Moreover, while the patent discloses the inclusion of a p-oxybenzoyl moiety, there is no disclosure nor suggestion of the usefulness of a poly(ester-amide) containing a 6-oxy-2-naphthoyl moiety, such as that of the present invention.

U.S. Pat. No. 3,809,679 discloses poly(ester-amides) consisting of 10 to 90 mole percent of recurring structural units derived from a dicarboxylic acid dihalide and a dihydroxy compound of a specified formula and 10 to 90 mole percent of recurring structural units derived from a dicarboxylic acid dihalide and a diamino compound of a specified formula. The poly(ester-amides) specifically exclude moieties derived from aromatic hydroxyacids, such as the 6-oxy-2-naphthoyl moiety included in the poly(ester-amide) of the present invention. Furthermore, most, if not all, of the poly(ester-amides) disclosed are not readily melt processable, and there is no disclosure of the existence of an anisotropic melt phase.

Commonly assigned U.S. application Ser. No. 214,557, filed Dec. 9, 1980, entitled "Poly(ester-amide) Capable of Forming an Anisotropic Melt Phase Derived From 6-Hydroxy-2-Naphthoic Acid, Dicarboxylic Acid, and Aromatic Monomer Capable of Forming an Amide Linkage" (Inventors: Anthony J. East, Larry F. Charbonneau, and Gordon W. Calundann), discloses a melt processable poly(ester-amide) exhibiting anisotropy in the melt phase which includes an oxynaphthoyl moiety. Unlike the present invention, the poly(ester-amide) there disclosed does not include an additional moiety derived from an aromatic hydroxyacid. The poly(ester-amide) of the present invention, which includes both an oxynaphthoyl moiety and such an additional moiety (e.g., an oxybenzoyl moiety), likewise demonstrates melt anisotropy in combination with excellent tractability in the melt phase.

Therefore, it is an object of the present invention to provide an improved poly(ester-amide) which is suited for the formation of quality molded articles, melt extruded fibers, and melt extruded films.

It is also an object of the present invention to provide an improved poly(ester-amide) which forms a highly tractable melt phase.

It is also an object of the present invention to provide an improved poly(ester-amide) which forms an anisotropic melt phase at a temperature well below its decomposition temperature and which may form quality fibers, films, and molded articles.

It is also an object of the present invention to provide an improved melt processable poly(ester-amide) capable of forming an anisotropic melt phase at a temperature below approximately 400° C., and preferably below approximately 350° C.

It is also an object of the present invention to provide an improved melt processable poly(ester-amide) which exhibits improved adhesion, improved fatigue resistance, and increased transverse strength.

These and other objects, as well as the scope, nature, and utilization of the present invention, will be apparent to those skilled in the art from the following detailed description.

SUMMARY OF THE INVENTION

A melt processable poly(ester-amide) capable of forming an anisotropic melt phase at a temperature below approximately 400° C. is provided. The poly(ester-amide) consists essentially of the recurring moieties I, II, III, IV, and, optionally, V wherein:

I is

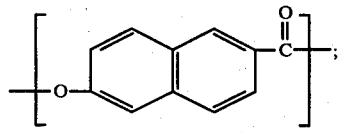

II is

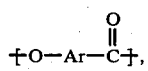

where Ar is a divalent radical comprising at least one aromatic ring other than naphthylene;

III is

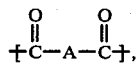

where A is a divalent carbocyclic radical;

IV is +Y—Ar'—Z+, where Ar' is a divalent radical comprising at least one aromatic ring, Y is O, NH, or NR, and Z is NH or NR, where R is an alkyl group of 1 to 6 carbon atoms or an aryl group; and V is +O—Ar"—O+, where Ar" is a divalent radical comprising at least one aromatic ring; wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof, and wherein the total molar concentration in the polymer of moieties I and II is within the range of approximately 10 to 90 mole percent, with the molar ratio of moiety I:moiety II being within the range of approximately 1:9 to 9:1; and the total molar concentration of moiety IV and moiety V is substantially equal to the molar concentration of moiety III, with moiety IV being present in a concentration within the range of approximately 5 to 45 mole percent.

DESCRIPTION OF THE PREFERRED EMBODIMENTS

The poly(ester-amide) of the present invention includes at least four recurring moieties which when combined in the poly(ester-amide) have been found to form an atypical, optically anisotropic melt phase. The polymer forms an anisotropic melt phase at a temperature below approximately 400° C. (e.g., below approximately 350° C.). The polymer melting temperatures may be confirmed by the use of a differential scanning calorimeter (i.e., DSC) employing repeat scans at a 20° C. per minute heat-up rate and by observing the peak of the DSC melt transition. The poly(ester-amide) commonly exhibits a melting temperature of at least approximately 200° C. and preferably of at least approximately 250° C. as determined by differential scanning calorimetry. The poly(ester-amide) of the present invention may exhibit more than one DSC transition temperature.

Because of its ability to exhibit anisotropic properties (i.e., liquid crystalline properties) in the melt, the poly(ester-amide) readily can form a product having a highly oriented molecular structure upon melt processing. Preferred poly(ester-amide) compositions are capable of undergoing melt processing at a temperature within the range of approximately 250° C. to 350° C., as discussed more fully hereinafter.

The poly(ester-amide) includes four essential moieties. Moiety I can be termed a 6-oxy-2-naphthoyl moiety and possesses the structural formula:

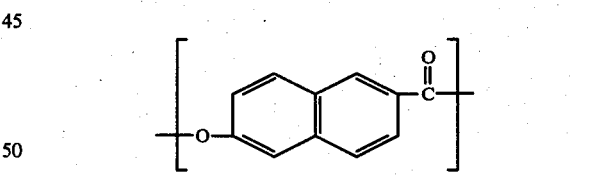

While not specifically illustrated in the structural formula, at least some of the hydrogen atoms present upon the aromatic rings of moiety I may be substituted. Representative ring substituted compounds from which moiety I can be derived include: 6-hydroxy-5-chloro-2-naphthoic acid, 6-hydroxy-5-methyl-2-naphthoic acid, 6-hydroxy-5-methoxy-2-naphthoic acid, 6-hydroxy-7-chloro-2-naphthoic acid, 6-hydroxy-5,7-dichloro-2-naphthoic acid, etc. The presence of ring substitution tends to modify to some degree the physical properties of the resulting polymer (e.g., the polymer may soften at a lower temperature, its impact strength may be improved, and the crystallinity of the solid polymer may be decreased). In a preferred embodiment wherein a poly(ester-amide) of optimum crystallinity in the solid state is desired, no ring substitution is present.

As will be apparent to those skilled in the art, moiety I can be derived from unsubstituted 6-hydroxy-2-naphthoic acid and the derivatives thereof. A convenient laboratory preparation for forming 6-hydroxy-2-naphthoic acid is described in Berichte, Vol. 58, 2835–45 (1925) by K. Fries and K. Schimmelschmidt which is herein incorporated by reference. Also, U.S. Pat. No. 1,593,816 is concerned with a process for synthesizing 6-hydroxy-2-naphthoic acid by reacting carbon dioxide with the potassium salt of beta-naphthol.

The second essential moiety (i.e., moiety II) is derived from an aromatic hydroxyacid other than 6-hydroxy-2-naphthoic acid or derivatives thereof. Moiety II has the structural formula

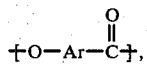

where Ar is a divalent radical comprising at least one aromatic ring other than 2,6-naphthylene. Moiety II is preferably derived from a symmetrical aromatic hydroxyacid. By "symmetrical," it is meant that the divalent bonds which join the moiety to other moieties in the main polymer chain are symmetrically disposed on one or more rings (e.g., are para to each other or diagonally disposed when present on a condensed ring system).

The preferred moiety which may serve as a symmetrical aromatic moiety derived from a hydroxyacid is a p-oxybenzoyl moiety. Other aromatic hydroxyacids from which moiety II may be derived include m-hydroxybenzoic acid; 7-hydroxy-2-naphthoic acid; 4-hydroxy-4'-carboxybiphenyl; 4-hydroxy-4'-carboxydiphenyl ether; 3-chloro-4-hydroxybenzoic acid; 3,5-dichloro-4-hydroxybenzoic acid; 3-methyl-4-hydroxybenzoic acid; 3,5-dimethyl-4-hydroxybenozic acid; 3-methoxy-4-hydroxybenzoic acid; 3,5-dimethoxy-4-hydroxybenzoic acid; etc.

Although moiety II may be substituted in the same manner as moiety I, highly satisfactory polymers can be formed wherein moiety II is free of ring substitution.

The total molar concentration of moiety I and moiety II in the polymer is within the range of approximately 10 to 90 mole percent. It is preferred that the total molar concentration of moiety I and moiety II in the polymer be within the range of approximately 20 to 80 mole percent, and it is especially preferred that the total molar concentration of moieties I and II be within the range of approximately 30 to 70 mole percent. The molar ratio of moiety I:moiety II is within the range of approximately 1:9 to 9:1. Preferably, the molar ratio of moiety I:moiety II is within the range of approximately 1:3 to 3:1. It is especially preferred that the molar ratio of moiety I:moiety II be within the range of approximately 2:3 to 3:2. Thus, the molar concentration of each of moiety I and moiety II is within the range of approximately 1 to 80 mole percent. More specifically, it is preferred that each of moiety I and II be within the range of approximately 5 to 60 mole percent, and it is especially preferred that each of moieties I and II be within the range of approximately 15 to 40 mole percent.

The third essential moiety (i.e., moiety III) is a carbocyclic dicarboxy moiety of the formula

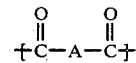

where A is a divalent carbocyclic radical. Preferably, the A radical comprises at least one aromatic ring or at least one divalent trans-1,4-cyclohexylene radical. Moiety III is more preferably a dicarboxaryl moiety, and, even more preferably, a symmetrical dicarboxaryl moiety. By "symmetrical", it is meant that the divalent bonds which join the moiety to other moieties in the main polymer chain are symmetrically disposed on one or more rings (e.g., are para to each other or diagonally disposed when present on a naphthalene ring).

The preferred moiety which may serve as a symmetrical dicarboxaryl moiety in the poly(ester-amide) of the present invention is a terephthaloyl moiety. An example of a non-symmetrical dicarboxaryl moiety is an isophthaloyl moiety. Although moiety III may be substituted in the same manner as moiety I, highly satisfactory polymers can be formed wherein the dicarboxaryl moiety is free of ring substitution.

Other divalent carbocyclic radicals include 4,4'-biphenylene; 1,2-ethylenebis(4-oxyphenyl); 2,6-naphthylene; metaphenylene; 2,7-naphthylene; trans-1,4-cyclohexylene; 4,4'-methylenebis(cyclohexyl); etc.

In the case where A comprises at least one divalent cyclohexylene radical, it has been found that only cyclohexylene radicals in the trans configuration give rise to a poly(ester-amide) which exhibits anisotropy in the melt phase. This is believed to be due to the disruption and destruction of the rod-like nature of the polymer molecules by the presence of cyclohexylene radicals in the cis configuration. However, a relatively small amount of cyclohexylene radicals in the cis configuration, as compared with the total amount of polymer, can be tolerated without seriously affecting the anisotropic nature of the polymer in the melt. It is nevertheless preferable to maximize the amount of cyclohexylene radicals in the trans configuration which is present in the polymer. Thus, it is preferred that at least 90 percent (e.g., 95 percent or more) of the cyclohexylene radicals be present in the trans configuration.

Trans- and cis-1,4-cyclohexanedicarboxylic acid can be distinguished from one another by such techniques as NMR and IR spectroscopy, as well as by their melting points. A melting point calibration curve is one means by which the relative amounts of trans- and cis-1,4-cyclohexanedicarboxylic acid in a mixture of the isomers can be determined.

Moiety IV represents an aromatic monomer which is capable of forming an amide linkage in the polymer. Moiety IV possesses the structural formula $-[Y-Ar'-Z]-$, where Ar' is a divalent radical comprising at least one aromatic ring, Y is O, NH, or NR, and Z is NH or NR, where R is an alkyl group of 1 to 6 carbon atoms or an aryl group. R is preferably a straight-chain alkyl group of 1 to 6 carbon atoms and is more preferably a methyl group.

Preferably, Ar' comprises a symmetrical divalent aromatic moiety. By "symmetrical", it is meant that the divalent bonds which join the moiety to other moieties in the main polymer chain are symmetrically disposed on one or more rings (e.g., are para to each other or diagonally disposed when present on a naphthalene ring). In especially preferred embodiments, Ar' comprises a p-phenylene radical.

Examples of monomers from which moiety IV can be derived include p-aminophenol, p-N-methylaminophenol, p-phenylenediamine, N-methyl-p-phenylenediamine, N,N'-dimethyl-p-phenylenediamine, m-aminophenol, 3-methyl-4-aminophenol, 2-chloro-4-aminophenol, 4-amino-1-naphthol, 4-amino-4'-hydroxydiphenyl, 4-amino-4'-hydroxydiphenyl ether, 4-amino-4'-hydroxydiphenyl methane, 4-amino-4'-hydroxydiphenyl ethane, 4-amino-4'-hydroxydiphenyl sulfone, 4-amino-4'-hydroxydiphenyl sulfide, 4,4'-diaminophenyl sulfide (thiodianiline), 4,4'-diaminodiphenyl sulfone, 2,5-diaminotoluene, 4,4'-ethylenedianiline, 4,4'-diaminodiphenoxyethane, etc.

Again, although moiety IV can be substituted, it is preferably free of ring substitution.

In addition to the four essential moieties described above, the poly(ester-amide) may further include an additional moiety (moiety V). Moiety V can be termed a dioxyaryl moiety and has the formula $+O-Ar''-O+$ where Ar'' is a divalent radical comprising at least one aromatic ring. Moiety V preferably is symmetrical, as defined above. Preferred moieties which may serve as a symmetrical dioxyaryl moiety in the poly(ester-amide) of the present invention include:

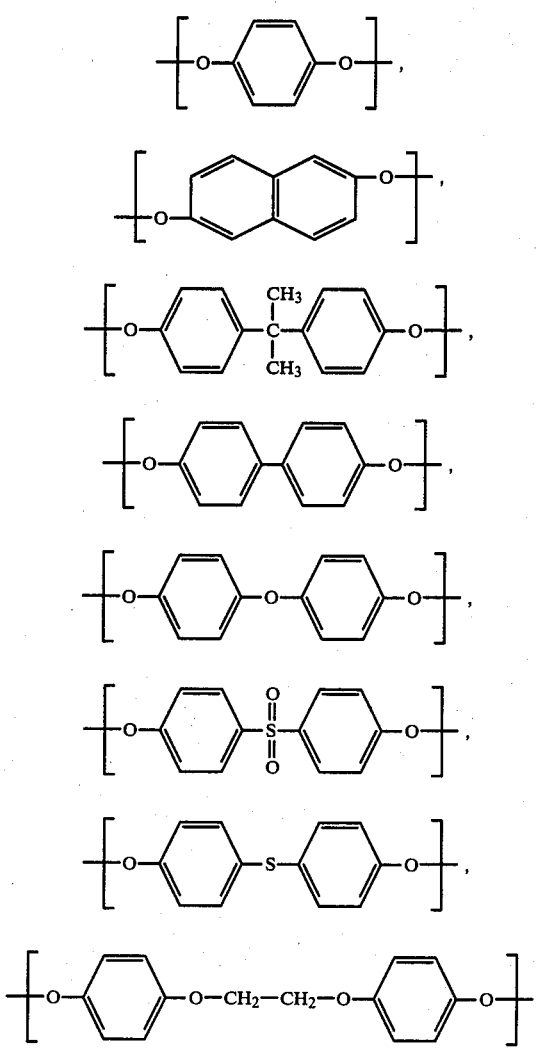

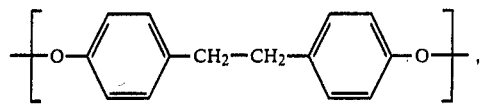

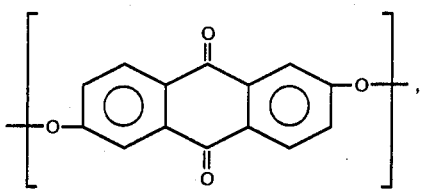

and mixtures of the foregoing. Highly satisfactory polymers can be formed wherein the dioxyaryl moiety is free of ring substitution.

A particularly preferred dioxyaryl moiety is:

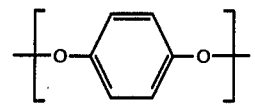

which readily may be derived from hydroquinone. Representative examples of ring substituted compounds from which moiety V can be derived include methylhydroquinone, chlorohydroquinone, bromohydroquinone, phenylhydroquinone, etc. An example of a non-symmetrical dioxyaryl moiety is that derived from resorcinol.

The total molar concentration of moieties IV and V is substantially equal to the molar concentration of moiety III, with moiety IV being present in a concentration within the range of approximately 5 to 45 mole percent. For example, the melt processable poly(ester-amide) may comprise 5 to 45 mole percent of moiety III, approximately 5 to 45 mole of moiety IV, and approximately 0 to 25 mole percent of moiety V (e.g., 5 to 25 mole percent). Preferably, moiety IV is present in a concentration within the range of approximately 5 to 40 mole percent, and moiety III is present in a concentration within the range of approximately 10 to 40 mole percent. In an even more preferred embodiment, moiety IV is present in a concentration within the range of approximately 5 to 35 mole percent.

The poly(ester-amide) of the present invention may consist essentially of, for example, approximately 1 to 80 mole percent of moiety I, approximately 1 to 80 mole percent of moiety II, approximately 5 to 45 mole percent of moiety III, approximately 5 to 45 mole percent of moiety IV, and approximately 0 to 25 mole percent of moiety V. Preferred compositions consist essentially of approximately 5 to 60 mole percent of moiety I, approximately 5 to 60 mole percent of moiety II, approximately 10 to 40 mole percent of moiety III, approximately 5 to 40 mole percent of moiety IV, and approximately 0 to 25 mole percent of moiety V. Even more preferred are those compositions which consist essentially of approximately 15 to 40 mole percent of moiety I, approximately 15 to 40 mole percent of moiety II, approximately 15 to 35 mole percent of moiety III, approximately 5 to 35 mole percent of moiety IV, and approximately 0 to 25 mole percent of moiety V (e.g., approximately 5 to 25 mole percent of moiety V).

As will be apparent to those skilled in the art, the total molar quantity of amide-forming units and dioxy units, if present, and the total molar quantity of dicarboxy units present within the poly(ester-amide) will be substantially equal.

It is further apparent to those of ordinary skill in the art that the total molar concentration, in mole percent, of moieties III, IV, and V in the polymer is determined by substracting the total molar concentration of moieties I and II from 100 mole percent.

The various moieties upon polymer formation will tend to be present in a random configuration.

The substituents, if present, on the rings of each of the moieties described above are selected from the group consisting of an alkyl group of 1 to 4 carbon atoms, an alkoxy group of 1 to 4 carbon atoms, halogen, phenyl, and mixtures of the foregoing.

Other ester-forming moieties (e.g., dicarboxy, dioxy, or hydroxycarboxy units) other than those previously discussed additionally may be included in the poly(ester-amide) of the present invention in a minor concentration so long as such moieties do not adversely influence the desired anisotropic melt phase exhibited by the poly(ester-amide) heretofore defined and do not raise the melting temperature of the resulting polymer above approximately 400° C.

The poly(ester-amide) of the present invention commonly exhibits

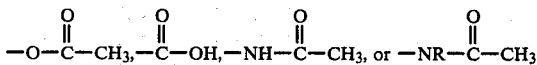

end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenyl ester

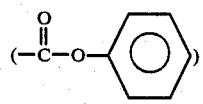

and methyl ester

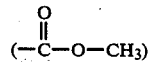

optionally may be included at the end of the polymer chains. The polymer also may be oxidatively cross-linked to at least some degree, if desired, by heating in an oxygen-containing atmosphere (e.g., in air) while in bulk form or as a previously shaped article at a temperature below its melting temperature for a limited period of time (e.g., for a few minutes).

The poly(ester-amide) of the present invention tends to be substantially insoluble in all common solvents, such as hexafluoroisopropanol and o-chlorophenol, and accordingly is not susceptible to solution processing. It can surprisingly be readily processed by common melt processing techniques as discussed hereafter. Most compositions are soluble to some degree in pentafluorophenol.

The poly(ester-amide) of the present invention commonly exhibits a weight average molecular weight (as prepared) of about 5,000 to about 50,000, and preferably about 10,000 to 30,000, e.g., about 15,000 to 17,500. Such molecular weight may be determined by standard techniques not involving the solutioning of the polymer, e.g., by end group determination via infrared spectroscopy on compression molded films. Alternatively, light scattering techniques in a pentafluorophenol solution may be employed to determine the molecular weight.

The poly(ester-amide) of the present invention is capable of undergoing melt processing at a temperature within the range of approximately 200° C. to 400° C. Preferably, the polymer is melt processed at a temperature within the range of approximately 250° C. to 350° C. and more preferably within the range of approximately 270° C. to 330° C.

The melting temperature (Tm) of the poly(ester-amide) of the present invention may vary widely with the composition of the poly(ester-amide).

The poly(ester-amide) prior to heat treatment additionally commonly exhibits an inherent viscosity (i.e., I.V.) of at least approximately 1.0 dl./g., and preferably at least approximately 2.0 dl./g., (e.g., approximately 3.0 to 9.0 dl./g.) when measured at a concentration of 0.1 weight/volume percent in pentafluorophenol at 60° C.

The poly(ester-amide) of the present invention commonly may be considered crystalline in the sense that fibers melt extruded therefrom exhibit X-ray diffraction patterns characteristic of polymeric crystalline materials, using Ni filtered CuK α radiation and flat plate cameras. In those embodiments wherein ring substitution is present as previously described or wherein certain aryl diols, such as 2,2-bis[4-hydroxyphenyl]propane, are present, the poly(ester-amides) may be substantially less crystalline in the solid phase and exhibit diffraction patterns typical of oriented amorphous fibers. In spite of the crystallinity commonly observed, the poly(ester-amide) of the present invention nevertheless may be easily melt processed in all instances.

The poly(ester-amide) of the present invention is readily tractable and forms an anisotropic melt phase whereby an atypical degree of order is manifest in the molten polymer. The improved tractability of the present poly(ester-amide) is due, at least in part, to the presence of moiety I, i.e., the 6-oxy-2-naphthoyl moiety. It has been observed that the tractability of the polymer is a function of the molar concentration of moiety I in the polymer.

The subject poly(ester-amide) readily forms liquid crystals in the melt phase. Such anisotropic properties are manifest at a temperature which is amenable for melt processing to form shaped articles. Such order in the melt may be confirmed by conventional polarized light techniques whereby crossed polarizers are utilized. More specifically, the anisotropic melt phase may conveniently be confirmed by the use of a Leitz polarizing microscope at a magnification of 40× with the sample on a Leitz hot stage and under a nitrogen atmosphere. The polymer melt is optically anisotropic, i.e., it transmits light when examined between crossed polarizers. Light is transmitted when the sample is optically anisotropic even in the static state.

The poly(ester-amide) of the present invention may be formed by a variety of techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, amine groups, etc. The organic monomer compounds may be reacted in the absence of a heat-exchange fluid via a melt acidolysis procedure. They accordingly may be heated initially to form a melt solution of the reactants with the reaction continuing as solid polymer particles are formed and suspended therein. A vacuum may be applied to facilitate removal of volatiles formed during the final stage of the condensation (e.g., acetic acid or water). Such a technique is disclosed in European Patent Application No. 79301276.6 (Publication No. 0 007 715), which is herein incorporated by reference.

In commonly assigned U.S. Pat. No. 4,067,852 of Gordon W. Calundann, entitled "Melt Processable Thermotropic Wholly Aromatic Polyester and Containing Polyoxybenzoyl Units" is described a slurry polymerization process which, although directed to the production of wholly aromatic polyesters, may be employed to form the poly(ester-amide) of the present invention. In that process, the solid product is suspended in a heat exchange medium. The disclosure of this patent is herein incorporated by reference.

When employing either the melt acidolysis procedure or the slurry procedure of U.S. Pat. No. 4,067,852, the organic monomer reactants from which the hydroxyacid moieties (i.e., moieties I and II), the amide-forming moiety (i.e., moiety IV), and the optional dioxyaryl moiety (i.e., moiety V) are derived may be initially provided in a modified form whereby the usual hydroxyl groups of these monomers are esterified (i.e., they are provided as acyl esters). For instance, lower acyl esters of 6-hydroxy-2-naphthoic acid, p-aminophenol, and hydroquinone, wherein the hydroxy groups are esterified, may be provided as reactants. The lower acyl groups preferably have from about 2 to about 4 carbon atoms. Preferably, the acetate esters of the organic compounds which form moieties I, II, IV, and V are provided. In addition, the amine group(s) of moiety IV may be provided as lower acyl amides. Accordingly, particularly preferred reactants for the condensation reaction are 6-acetoxy-2-naphthoic acid, p-acetoxybenzoic acid, p-acetoxyacetanilide, and hydroquinone diacetate.

Representative catalysts which optionally may be employed in either the melt acidolysis procedure or in the procedure of U.S. Pat. No. 4,067,852 include alkyl tin oxide (e.g., dibutyl tin oxide), diaryl tin oxide, alkyl tin acids, acyl esters of tin, titanium dioxide, alkoxy titanium silicates, titanium alkoxides, alkali and alkaline earth metal salts of carboxylic acids (e.g., sodium acetate), the gaseous acid catalysts such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.12 percent by weight.

The molecular weight of a previously formed poly(ester-amide) may be further increased via a solid state polymerization procedure wherein the particulate polymer is heated in a flowing inert gaseous atmosphere (e.g., in a flowing nitrogen atmosphere) at a temperature approximately 20° C. below the melting temperature of the polymer for 10 to 12 hours.

The poly(ester-amide) of the present invention readily can be melt processed to form a variety of shaped articles, e.g., molded three-dimensional articles, fibers, films, tapes, etc. The poly(ester-amide) of the present invention is suited for molding applications and may be molded via standard injection molding techniques commonly utilized when forming molded articles. It is not essential that more severe molding conditions (e.g., higher temperatures, compression molding, impact molding, or plasma spraying techniques) be utilized. Fibers or films may be melt extruded.

A molding compound may be formed from the poly(ester-amide) of the present invention which incorporates approximately 1 to 60 percent by weight of a solid filler (e.g., talc) and/or reinforcing agent (e.g., glass fibers).

The poly(ester-amide) also may be employed as a coating material which is applied as a powder or from a liquid dispersion.

When forming fibers and films, the extrusion orifice may be selected from among those commonly utilized during the melt extrusion of such shaped articles. For instance, the shaped extrusion orifice may be in the form of a rectangular slit (i.e., a slit die) when forming a polymeric film. When forming a filamentary material, the spinneret selected may contain one and preferably a plurality of extrusion orifices. For instance, a standard conical spinneret, such as those commonly used in the melt spinning of polyethylene terephthalate, containing 1 to 2000 holes (e.g., 6 to 1500 holes) having a diameter of about 1 to 60 mils (e.g., 5 to 40 mils) may be utilized. Yarns of about 20 to 200 continuous filaments are commonly formed. The melt-spinnable poly(ester-amide) is supplied to the extrusion orifice at a temperature above its melting temperature, e.g., a temperature of about 270° C. to 330° C. in preferred embodiments.

Subsequent to extrusion through the shaped orifice, the resulting filamentary material or film is passed in the direction of its length through a solidification or quench zone wherein the molten filamentary material or film is transformed into a solid filamentary material or film. The resulting fibers commonly have a denier per filament of about 2 to 40, and preferably a denier per filament of about 3 to 5.

The resulting filamentary material or film optionally may be subjected to a thermal treatment whereby its physical properties are further enhanced. The tenacity of the fiber or film generally is increased by such thermal treatment. More specifically, the fibers or films preferably may be thermally treated in an inert atmosphere (e.g., nitrogen, argon, helium) or alternatively in a flowing oxygen-containing atmosphere (e.g., air) with or without stress at a temperature below the polymer melting temperature until the desired property enhancement is achieved. Thermal treatment times commonly range from a few minutes to several days. Generally, as the product is thermally treated, its melting temperature progressively is raised. The temperature of the atmosphere may be staged or continuously increased during the thermal treatment or held at a constant level. For instance, the product may be heated at 250° C. for one hour, at 260° C. for one hour, and at 270° C. for one hour. Alternatively, the product may be heated at about 10° C. to 20° C. below the temperature at which it melts for about 45 hours. Optimal heat treatment conditions will vary with the specific composition of the poly(ester-amide) and with the process history of the product.

The as-spun fibers formed from the poly(ester-amide) of the present invention are fully oriented and exhibit highly satisfactory physical properties which render them suitable for use in high performance applications. The as-spun fibers commonly exhibit an average single filament tenacity of at least 1 gram per denier (e.g., about 3 to 10 grams per denier) and an average single filament tensile modulus of at least about 200 grams per denier (e.g., about 300 to 800 grams per denier) and exhibit an extraordinary dimensional stability at elevated temperature (e.g., at temperatures of about 150° to 200° C.). Following thermal treatment (i.e., annealing), the fibers commonly exhibit an average single filament tenacity of at least 5 grams per denier (e.g., 15 to 40 grams per denier). Such properties enable the fibers to be used with particular advantage as tire cords and in other industrial applications, such as conveyor belts, hose, rope, cabling, resin reinforcement, etc. Films formed of the polyester of the present invention may be used as strapping tape, cable wrap, magnetic tape, electric motor dielectric film, etc. The fibers and films exhibit an inherent resistance to burning.

It is anticipated that the poly(ester-amide) compositions of the present invention will exhibit improved adhesion, improved fatigue resistance, and increased transverse strength over known polymers, such as wholly aromatic polyesters.

The following Examples are presented as specific illustrations of the claimed invention. It should be understood, however, that the invention is not limited to the specific details set forth in the Examples.

EXAMPLE 1

This Example illustrates the preparation of a poly(ester-amide) from 6-hydroxy-2-naphthoic acid, p-hydroxybenzoic acid, terephthalic acid, and p-aminophenol (or derivatives thereof) in the molar ratio 30:30:20:20.

A 300 ml. 3-necked polymer flask was fitted with a sealed glass paddle stirrer, a gas inlet, and a distillation head and condenser. Into the flask were placed 34.5 g. (0.15 mole) of 6-acetoxy-2-naphthoic acid, 27.0 g. (0.15 mole) of p-acetoxybenzoic acid, 16.6 g. (0.10 mole) of terephthalic acid, and 20.0 g. (0.104 mole) of p-acetoxyacetanilide. 0.02 g. of sodium acetate was added as a catalyst. The flask was evacuated and flushed with nitrogen three times. The flask was heated in an oil bath to 250° C. under a slow stream of nitrogen gas. The contents rapidly melted to an opaque slurry and agitation was begun. Acetic acid rapidly began to distill over and was collected in a graduated cyclinder. After 15 minutes at 250° C., 11 ml. (38% of the theoretical yield) of acetic acid had been collected. At this point, the melt quite suddenly became lumpy and resembled cottage cheese, but as heating and stirring continued, the melt again became smooth and creamy-white over another 15 minutes. After a total of 45 minutes at 250° C., the oil bath was raised to 280° C. At this point a total of 17 ml. (60% of theoretical yield) of acetic acid had distilled over. Heating continued at 280° C. for a total of 45 minutes, and the bath was then raised to 320° C. At this point, 25 ml. (87% of the theoretical yield) of acetic acid had been collected. The melt was smooth, creamy, and noticeably more viscous. Heating was continued at 320° C. for a total of 45 minutes. At the end of this time, 27 ml. (94% of theoretical yield) of acetic acid had been collected.

Vacuum (0.3 mm. Hg) was then slowly applied to the system. Great care was required to control foaming of the melt. After full vacuum had been achieved, the melt was held for 15 minutes at 320° C., and the temperature was then raised to 340° C. Again, foaming set in, but it was controlled by adjusting the rate of agitation. The melt had become very viscous by this time. After 10 minutes at 340° C., the bath was raised to 350° C. and held there for 30 minutes. The melt initially became more fluid but then gradually began to thicken.

At the end of the heating cycle, the vacuum was released with nitrogen, and the flask was allowed to cool under a nitrogen atmosphere. Fibers could be pulled from the melt. When cool, the flask was broken, and the lump of creamy-yellow polymer was freed from broken glass and ground in a Wiley mill.

The polymer exhibited an inherent viscosity of 8.75 dl./g. when measured at a concentration of 0.1 weight-/volume percent in pentafluorophenol at 60° C. The polymer exhibited a glass-rubber transition inflection at 100° C. and a weak endotherm at 235° C. when measured by differential scanning calorimetry. When examined under crossed polarizers above 300° C., the polymer exhibited melt anisotropy.

EXAMPLE 2

This Example illustrates the preparation of a poly(ester-amide) from 6-hydroxy-2-naphthoic acid, p-hydroxybenzoic acid, terephthalic acid, and p-phenylenediamine (or derivatives thereof) in the ratio 24:56:10:10.

A 300 ml. 3-necked polymer flask was fitted with a sealed glass paddle stirrer, a gas inlet, a distillation head, condenser, and receiver. Into the flask were placed 27.63 g. (0.12 mole) of 6-acetoxy-2-naphthoic acid, 50.45 g. (0.28 mole) of 4-acetoxybenzoic acid, 8.31 g. (0.05 mole) of terephthalic acid, and 9.61 g. (0.05 mole) of N,N'-1,4-phenylenebisacetamide. 0.010 g. of sodium acetate was added as a catalyst. The flask was evacuated and flushed with nitrogen three times. The flask was heated using an external sand bath to 250° C. Polymerization was conducted under nitrogen according to the following time-temperature schedule: 250° C. to 275° C., 45 minutes; 320° C., 45 minutes; and 340° C., 65 minutes. Polymerization was completed by heating at 360° C. under a reduced pressure of 0.5 mm. Hg for 30 minutes. The paddle stirrer was then removed under a heavy flow of nitrogen, and a viscous lump of fibrous polymer was pulled from the melt by the stirrer.

After cooling to room temperature, the flask was broken and the polymer was recovered. A Wiley mill with a 6 mm. screen was used to grind the polymer before it was extracted for 1 hour with acetone and 1 hour with petroleum ether in a Soxhlet apparatus.

The polymer exhibited an inherent viscosity of 5.62 dl./g. when measured at a concentration of 0.1 weight-/volume percent in pentafluorophenol at 60° C. The polymer exhibited a broad diffuse endothermic transition at 300° C. when measured by differential scanning calorimetry. When the polymer was examined under crossed polarizers above 330° C., melt anisotropy was observed.

The polymer was dried at 130° C. and 1 mm. Hg for one day. The dried polymer was then melt spun through a 0.007 inch single hole jet within the temperature range of 345° C. to 390° C. at a throughput of 0.14 g./min. The maximum take-up speed was 55 m./min. Single filament properties of a fiber spun at 376° C. were:

| | |
|---|---|
| Tenacity | 4.5 g./d. |
| Elongation | 1.3% |
| Initial Modulus | 447 g./d. |

| | |
|---|---|
| Denier | 29.7 |

A sample of this fiber was heat treated in a flowing stream of nitrogen at 300° C. for 15 hours. The heat treated fiber properties were:

| | |
|---|---|
| Tenacity | 11.1 g./d. |
| Elongation | 2.91% |
| Initial Modulus | 439 g./d. |

EXAMPLE 3

The poly(ester-amide) described in Example 1 was prepared again in exactly the same way until the end of acetolysis at 320° C. Vacuum (0.4 mm. Hg) was then applied, and the mixture was heated and stirred for only 45 minutes under full vacuum. The temperature was gradually raised to 330° C. and held there for 10 minutes.

The polymer was isolated as in Example 1, and long stiff fibers having a "woody" fracture could be pulled from the melt. After grinding in a Wiley mill, the polymer was extracted with acetone in a Soxhlet apparatus and dried.

The polymer exhibited an inherent viscosity of 3.45 dl./g. when measured at a concentration of 0.1 weight-/volume percent in pentafluorophenol at 60° C. The polymer exhibited minimal traces of an endotherm when measured by differential scanning calorimetry. When the polymer was examined under crossed polarizers above 300° C., melt anisotropy was observed.

The powdered polymer was melt spun as a single filament through a 0.007 inch hole at 329° C. at a through-put of 0.14 g./min. The monofil was wound up at 138 m./min. The fibers produced exhibited the following single filament as-spun properties:

| | |
|---|---|
| Tenacity | 7.0 g./d. |
| Elongation | 1.9% |
| Initial Modulus | 520 g./d. |
| Denier | 8.5 |

The fibers were heated at 300° C. for 8 hours. The heat treated fibers exhibited the following properties:

| | |
|---|---|
| Tenacity | 19.9 g./d. |
| Elongation | 4.0% |
| Initial Modulus | 525 g./d. |

EXAMPLE 4

This Example illustrates the preparation of a poly(ester-amide) from 6-hydroxy-2-naphthoic acid, p-hydroxybenzoic acid, trans-1,4-cyclohexanedicarboxylic acid, and p-aminophenol (or derivatives thereof) in the ratio 30:30:20:20.

Into the apparatus described in Example 1 were placed 34.5 g. (0.15 mole) of 6-acetoxy-2-naphthoic acid, 27.0 g. (0.15 mole) of p-acetoxybenzoic acid, 17.2 g. (0.10 mole) of 95% trans-1,4-cyclohexanedicarboxylic acid, and 19.5 g. (0.101 mole) of p-acetoxyacetanilide. Sodium acetate (0.02 g.) was added as a catalyst. The flask was evacuated and flushed with nitrogen 3 times and was then heated in an oil bath for 45 minutes at 250° C., 45 minutes at 280° C., 30 minutes at 320° C., and, finally, 17 minutes under a vacuum of 0.5 mm. Hg at 320° C. Initially, the melt was clear and brown, but, as acetic acid distilled over, it rapidly became opaque. Gradually, the tan-colored melt became more and more viscous. The total yield of acetic acid distillate was 26.1 ml. (91% of the theoretical yield).

As vacuum was applied, the melt became foamy, and care was necessary to avoid excessive frothing. At the end of 17 minutes, the opaque viscous pale tan-colored melt had begun to climb the stirrer shaft, so the vacuum was released with nitrogen, and the flask was cooled under a nitrogen atmosphere. Long, stiff fibers having a "woody" fracture could be pulled from the molten polymer.

The polymer was isolated as in Example 1 and ground in a Wiley mill. The polymer exhibited an inherent viscosity of 5.07 dl./g. when measured at a concentration of 0.1 weight/volume percent in pentafluorophenol at 60° C. The polymer exhibited a glass transition inflection at 25° C. and a $T_m$ endotherm at 220° C. when measured by differential scanning calorimetry. The polymer formed an anisotropic melt on the polarizing hot-stage microscope above 220° C.

The dried polymer was spun through a single 0.007 inch hole at 284° C. at a throughput of 0.42 g./min. and a take-up speed of 987 m./min. The single filament properties were:

| | |
|---|---|
| Tenacity | 6.21 g./d. |
| Elongation | 1.4% |
| Initial Modulus | 602 g./d. |
| Denier | 3.75 |

EXAMPLE 5

This Example illustrates the preparation of a poly(ester-amide) from 6-hydroxy-2-naphthoic acid, p-hydroxybenzoic acid, terephthalic acid, p-aminophenol, and hydroquinone (or derivatives thereof) in the ratio 30:20:25:15:10.

Into the apparatus described in Example 1 were charged 34.5 g. (0.15 mole) of 6-acetoxy-2-naphthoic acid, 18.0 g. (0.1 mole) of p-acetoxybenzoic acid, 20.8 g. (0.125 mole) of terephthalic acid, 14.5 g. (0.0751 mole) of p-acetoxyacetanilide, and 10.0 g. (0.052 mole) of hydroquinone diacetate. Sodium acetate (0.02 g.) was added as a catalyst.

The flask was evacuated, flushed with nitrogen 3 times, and heated in an oil bath at 250° C. for 45 minutes, 280° C. for 45 minutes, 300° C. for 30 minutes, and 320° C. for 30 minutes. The total yield of acetic acid was 26.0 ml. (91% of the theoretical yield). The melt was an opaque pale tan color. Vacuum (0.5 mm. Hg) was applied slowly so as to minimize foaming. The melt was heated under vacuum at 320° C. for an additional 50 minutes. The vacuum was then released with nitrogen. Long, stiff fibers could be pulled from the melt. The polymer was cooled under nitrogen and isolated as in Example 1.

The polymer exhibited an inherent viscosity of 3.24 dl./g. when measured at a concentration of 0.1 weight/volume percent in pentafluorophenol at 60° C. The polymer exhibited a glass transition inflection at 112° C. and a $T_m$ endotherm at 300° C. when measured by differential scanning calorimetry. The polymer formed an anisotropic melt on the polarizing hot-stage microscope above 300° C.

The dried polymer was melt-spun at 360° C. through a 0.007 inch hole at a throughput of 0.42 g./min. at a take-up speed of 922 m./min. The resultant fibers exhibited the following single filament properties:

| | |
|---|---|
| Tenacity | 7.2 g./d. |
| Elongation | 1.9% |
| Initial Modulus | 539 g./d. |
| Denier | 3.61 |

The fibers were heat treated in a flowing stream of nitrogen at 250° C. for 2 hours and then at 290° C. for 8 hours. The heat treated fiber properties were:

| | |
|---|---|
| Tenacity | 20.5 g./d. |
| Elongation | 4.5% |
| Initial Modulus | 476 g./d. |

EXAMPLE 6

This Example illustrates the preparation of a poly(ester-amide) from 6-hydroxy-2-naphthoic acid, p-hydroxybenzoic acid, terephthalic acid, 1,4-phenylenediamine, and 2,6-dihydroxyanthraquinone (or derivatives thereof) in the molar ratio 40:20:20:5:15.

Into the apparatus described in Example 1 were placed 46.04 g. (0.2 mole) of 6-acetoxy-2-naphthoic acid, 18.02 g. (0.1 mole) of p-acetoxybenzoic acid, 16.61 g. (0.1 mole) of terephthalic acid, 4.81 g. (0.025 mole) of N,N'-1,4-phenylenebisacetamide, and 24.32 g. (0.075 mole) of 2,6-dihydroxyanthraquinone diacetate. The flask was evacuated and flushed with nitrogen 3 times and was then warmed by means of an external oil bath to about 250° C. at which point the monomers melted and the mixture began to polymerize. The temperature of the oil bath was increased from 250° C. to 280° C. over the period of 1 hour. The apparatus was then heated at 300° C. for 30 minutes, 310° C. for 10 minutes, 320° C. for 105 minutes, 330° C. for 30 minutes, and 340° C. for 45 minutes. After cooling to room temperature, the polymer was ground in a Wiley mill and was extracted as in Example 2.

The polymer exhibited an inherent viscosity of 0.98 dl./g. when measured at a concentration of 0.1 weight-/volume percent in pentafluorophenol at 60° C. The polymer exhibited a glass transition temperature of 122° C. when measured by differential scanning calorimetry. The polymer exhibited an anisotropic melt phase.

EXAMPLE 7

This Example illustrates the preparation of a poly(ester-amide) from 6-hydroxy-2-naphthoic acid, p-hydroxybenzoic acid, terephthalic acid, 1,4-phenylenediamine, and 2,6-dihydroxynaphthalene (or derivatives thereof) in the molar ratio 20:20:30:5:25.

Into the apparatus described in Example 1 were placed 23.02 g. (0.1 mole) of 6-acetoxy-2-naphthoic acid, 18.02 g. (0.1 mole) of p-acetoxybenzoic acid, 24.92 g. (0.15 mole) of terephthalic acid, 4.81 g. (0.025 mole) of N,N'-1,4-phenylenebisacetamide, and 30.5 g. (0.125 mole) of 2,6-dihydroxynaphthalene diacetate. Sodium acetate (200 p.p.m.) was added as a polymerization catalyst.

Polymerization was conducted as in Example 1. The flask was heated for a total of 3¼ hours at temperatures between 250° C. and 340° C. under nitrogen. The flask was then heated at 340° C. for 45 minutes under a vacuum of 0.3 mm. Hg.

At the end of the heating cycle, the vacuum was released with nitrogen, and the flask was allowed to cool under a nitrogen atmosphere. The polymer was recovered, ground, and extracted in the manner described in Example 2.

The polymer exhibited an inherent viscosity of 2.8 dl./g. when measured at a concentration of 0.1 weight-/volume percent in pentafluorophenol at 60° C. The polymer exhibited an endotherm at 283° C. when measured by differential scanning calorimetry. The polymer exhibited an anisotropic melt phase.

The dried polymer was melt spun through a 0.007 inch single hole jet at 344° C. at a throughput of 0.42 g./min. and a take-up speed of 393 m./min. The single filament properties were:

| | |
|---|---|
| Tenacity | 3.98 g./d. |
| Elongation | 1.26% |
| Initial Modulus | 374 g./d. |
| Denier | 10.1 |

Although the invention has been described with preferred embodiments, it is to be understood that variations and modifications may be employed as will be apparent to those of ordinary skill in the art. Such variations and modifications are to be considered within the purview and scope of the claims appended hereto.

We claim:

1. A melt processable poly(ester-amide) capable of forming an anisotropic melt phase at a temperature below approximately 400° C. consisting essentially of recurring moieties I, II, III, IV, and, optionally, V wherein:

I is

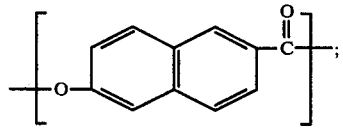

II is

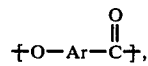

where Ar is a divalent radical comprising at least one aromatic ring other than 2,6-naphthylene;

III is

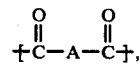

where A is a divalent carbocyclic radical;

IV is $+Y-AR'-Z+$, where Ar' is a divalent radical comprising at least one aromatic ring, Y is O, NH, or NR, and Z is NH or NR, where R is an alkyl group of 1 to 6 carbon atoms or an aryl group; and V is $+O-AR''-O+$, where Ar'' is a divalent radical comprising at least one aromatic ring, wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof, and wherein the total molar concentration of moiety I and moiety II in the polymer is within the range of approximately 10 to 90 mole percent, with the molar ratio of moiety I:moiety II being within the range of approximately 1:9 to 9:1, and the total molar concentration of moiety IV and moiety V is substantially equal to the molar concentration of moiety III, with moiety IV being present in a concentration within the range of approximately 5 to 45 mole percent.

2. The melt processable poly(ester-amide) of claim 1 which is capable of forming an anisotropic melt phase at a temperature below approximately 350° C.

3. The melt processable poly(ester-amide) of claim 1 which exhibits an inherent viscosity of at least approximately 1.0 dl./g. when measured at a concentration of 0.1 weight/volume percent in pentafluorophenol at 60° C.

4. The melt processable poly(ester-amide) of claim 3 which exhibits an inherent viscosity of at least approximately 2.0 dl./g. when measured at a concentration of 0.1 weight/volume percent in pentafluorophenol at 60° C.

5. The melt processable poly(ester-amide) of claim 1 consisting essentially of approximately 1 to 80 mole percent of moiety I, approximately 1 to 80 mole percent of moiety II, approximately 5 to 45 mole percent of moiety III, approximately 5 to 45 mole percent of moiety IV, and approximately 0 to 25 mole percent of moiety V.

6. The melt processable poly(ester-amide) of claim 1 wherein the total molar concentration of moiety I and moiety II is within the range of approximately 20 to 80 mole percent.

7. The melt processable poly(ester-amide) of claim 1 wherein the molar ratio of moiety I:moiety II is within the range of approximately 1:3 to 3:1.

8. The melt processable poly(ester-amide) of claim 1 wherein said divalent carbocyclic radical of moiety III comprises at least one aromatic ring or at least one divalent trans-1,4-cyclohexylene radical.

9. The melt processable poly(ester-amide) of claim 5 wherein moiety V is present in a concentration within the range of approximately 5 to 25 mole percent.

10. A molding compound comprising the melt processable poly(ester-amide) of claim 1 which incorporates approximately 1 to 60 percent by weight of a solid filler and/or reinforcing agent.

11. A molded article comprising the melt processable poly(ester-amide) of claim 1.

12. A fiber which has been melt spun from the melt processable poly(ester-amide) of claim 1.

13. A film which has been melt extruded from the melt processable poly(ester-amide) of claim 1.

14. A melt processable poly(ester-amide) capable of forming an anisotropic melt phase at a temperature below approximately 400° C. consisting essentially of recurring moieties I, II, III, IV, and, optionally, V wherein:

I is

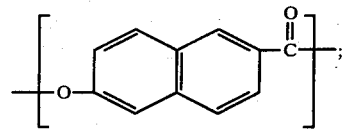

II is

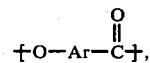

where Ar is a divalent radical comprising at least one aromatic ring other than 2,6-naphthylene;

III is

where A is a divalent radical comprising at least one aromatic ring or at least one divalent trans-1,4-cyclohexylene radical;

IV is $+Y-Ar'-Z+$, where Ar' is a divalent radical comprising at least one aromatic ring, Y is O, NH, or NR, and Z is NH or NR, where R is an alkyl group of 1 to 6 carbon atoms or an aryl group; and V is $+O-Ar''-O+$, where Ar'' is a divalent radical comprising at least one aromatic ring, wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof, and wherein the total molar concentration of moiety I and moiety II in the polymer is within the range of approximately 20 to 80 mole percent, with the molar ratio of moiety I:moiety II being within the range of approximately 1:3 to 3:1, and the total molar concentration of moiety IV and moiety V is substantially equal to the molar concentration of moiety III, with moiety IV being present in a concentration within the range of approximately 5 to 40 mole percent.

15. The melt processable poly(ester-amide) of claim 14 which is capable of forming an anisotropic melt phase at a temperature below approximately 350° C.

16. The melt processable poly(ester-amide) of claim 14 which exhibits an inherent viscosity of at least approximately 1.0 dl./g. when measured at a concentration of 0.1 weight/volume percent in pentafluorophenol at 60° C.

17. The melt processable poly(ester-amide) of claim 16 which exhibits an inherent viscosity within the range of approximately 3.0 to 9.0 dl./g. when measured at a concentration of 0.1 weight/volume percent in pentafluorophenol at 60° C.

18. The melt processable poly(ester-amide) of claim 14 consisting essentially of approximately 5 to 60 mole percent of moiety I, approximately 5 to 60 mole percent of moiety II, approximately 10 to 40 mole percent of moiety III, approximately 5 to 40 mole percent of moiety IV, and approximately 0 to 25 mole percent of moiety V.

19. The melt processable poly(ester-amide) of claim 14 wherein the total molar concentration of moiety I and moiety II is within the range of approximately 30 to 70 mole percent.

20. The melt processable poly(ester-amide) of claim 14 wherein the molar ratio of moiety I:moiety II is within the range of approximately 2:3 to 3:2.

21. The melt processable poly(ester-amide) of claim 14 wherein said divalent radical of moiety III comprises at least one aromatic ring.

22. The melt processable poly(ester-amide) of claim 18 wherein moiety V is present in a concentration within the range of approximately 5 to 25 mole percent.

23. A molding compound comprising the melt processable poly(ester-amide) of claim 14 which incorporates approximately 1 to 60 percent by weight of a solid filler and/or reinforcing agent.

24. A molded article comprising the melt processable poly(ester-amide) of claim 14.

25. A fiber which has been melt spun from the melt processable poly(ester-amide) of claim 14.

26. A film which has been extruded from the melt processable poly(ester-amide) of claim 14.

27. A melt processable poly(ester-amide) capable of forming an anisotropic melt phase at a temperature below approximately 350° C. consisting essentially of recurring moieties I, II, III, IV, and, optionally, V wherein:

I is

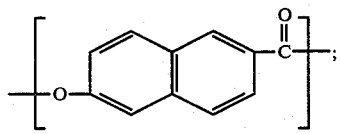

II is

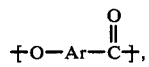

where Ar is a divalent radical comprising at least one aromatic ring other than 2,6-naphthylene;

III is

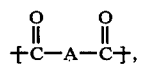

where A is a divalent radical comprising at least one aromatic ring;

IV is +Y—Ar'—Z+ where Ar' is a divalent radical comprising at least one aromatic ring, Y is O, NH, or NR, and Z is NH or NR, where R is an alkyl group of 1 to 6 carbon atoms or an aryl group; and V is +O—Ar"—O+, where Ar" is a divalent radical comprising at least one aromatic ring, wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof, and wherein the total molar concentration of moiety I and moiety II in the polymer is within the range of approximately 30 to 70 mole percent, with the molar ratio of moiety I:moiety II being within the range of approximately 2:3 to 3:2, and the total molar concentration of moiety IV and moiety V is substantially equal to the molar concentration of moiety III, with moiety IV being present in a concentration within the range of approximately 5 to 35 mole percent.

28. The melt processable poly(ester-amide) of claim 27 which exhibits an inherent viscosity of at least approximately 1.0 dl./g. when measured at a concentration of 0.1 weight/volume percent in pentafluorophenol at 60° C.

29. The melt processable poly(ester-amide) of claim 28 which exhibits an inherent viscosity within the range of approximately 3.0 to 9.0 dl./g. when measured at a concentration of 0.1 weight/volume percent in pentafluorophenol at 60° C.

30. The melt processable poly(ester-amide) of claim 27 consisting essentially of approximately 15 to 40 mole percent of moiety I, approximately 15 to 40 mole percent of moiety II, approximately 15 to 35 mole percent of moiety III, approximately 5 to 35 mole percent of moiety IV, and approximately 0 to 25 percent of moiety V.

31. The melt processable poly(ester-amide) of claim 30 wherein the moiety V is present in a concentration within the range of approximately 5 to 25 mole percent.

32. The melt processable poly(ester-amide) of claim 27 wherein said moiety II is a p-oxybenzoyl moiety.

33. The melt processable poly(ester-amide) of claim 27 wherein said moiety III is a terephthaloyl moiety.

34. The melt processable poly(ester-amide) of claim 27 wherein said moiety IV is derived from p-aminophenol or p-phenylenediamine.

35. The melt processable poly(ester-amide) of claim 27 wherein said moiety V is derived from hydroquinone.

36. A molding compound comprising the melt processable poly(ester-amide) of claim 27 which incorporates approximately 1 to 60 percent by weight of a solid filler and/or reinforcing agent.

37. A molded article comprising the melt processable poly(ester-amide) of claim 27.

38. A fiber which has been melt spun from the melt processable poly(ester-amide) of claim 27.

39. A film which has been melt extruded from the melt processable poly(ester-amide) of claim 27.

* * * * *